United States Patent
Fujiya et al.

(10) Patent No.: US 10,662,785 B2
(45) Date of Patent: May 26, 2020

(54) METHOD OF WELDING EROSION RESISTANCE METALLIC MATERIAL AND TURBINE BLADE

(71) Applicant: MITSUBISHI HITACHI POWER SYSTEMS, LTD., Kanagawa (JP)

(72) Inventors: Yasuyuki Fujiya, Tokyo (JP); Takehisa Okuda, Tokyo (JP); Hiroharu Oyama, Tokyo (JP); Motonari Machida, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 542 days.

(21) Appl. No.: 14/429,212

(22) PCT Filed: Sep. 20, 2013

(86) PCT No.: PCT/JP2013/075526
§ 371 (c)(1),
(2) Date: Mar. 18, 2015

(87) PCT Pub. No.: WO2014/046245
PCT Pub. Date: Mar. 27, 2014

(65) Prior Publication Data
US 2015/0233257 A1     Aug. 20, 2015

(30) Foreign Application Priority Data

Sep. 21, 2012   (JP) .................................. 2012-208769

(51) Int. Cl.
*F01D 5/28*      (2006.01)
*B23K 26/32*     (2014.01)
(Continued)

(52) U.S. Cl.
CPC .............. *F01D 5/286* (2013.01); *B23K 26/32* (2013.01); *B23K 26/342* (2015.10); *F01D 5/288* (2013.01);
(Continued)

(58) Field of Classification Search
None
See application file for complete search history.

(56) References Cited

U.S. PATENT DOCUMENTS 4,842,663 A * 6/1989 Kramer .................. B23P 6/005
156/153
5,183,390 A   2/1993 Amos
(Continued)

FOREIGN PATENT DOCUMENTS

CN      101462202     6/2009
CN      101495265     7/2009
(Continued)

OTHER PUBLICATIONS

Office Action dated Mar. 21, 2016 in Korean patent application No. 2015-7006689 (with English translation).
(Continued)

*Primary Examiner* — Christopher Verdier
*Assistant Examiner* — Jason A Fountain
(74) *Attorney, Agent, or Firm* — Wenderoth, Lind & Ponack, L.L.P.

(57) ABSTRACT

A method of welding erosion resistance metallic material is a method of welding erosion resistance metallic material to a base element (1) of a turbine blade leading edge portion (1A). The method includes the steps of: forming a curved surface in the leading edge portion (1A) to which the erosion resistance metallic material is applied so that a radius R of the curved surface is larger than thickness t of the base
(Continued)

element (1); and welding the erosion resistance metallic material to the leading edge portion (1A).

20 Claims, 9 Drawing Sheets

(51) Int. Cl.
  *B23K 26/342* (2014.01)
  *F01D 5/22* (2006.01)
  *B23K 103/00* (2006.01)
  *B23K 101/00* (2006.01)

(52) U.S. Cl.
  CPC .... *B23K 2101/001* (2018.08); *B23K 2103/50* (2018.08); *F01D 5/225* (2013.01); *F05D 2220/31* (2013.01); *F05D 2230/234* (2013.01); *F05D 2230/31* (2013.01); *F05D 2240/303* (2013.01)

(56) References Cited

U.S. PATENT DOCUMENTS

| | | | | |
|---|---|---|---|---|
| 5,448,828 | A * | 9/1995 | Willems | B22F 7/06 29/889.1 |
| 5,532,454 | A * | 7/1996 | Kuhnen | B23K 9/0213 219/125.11 |
| 5,841,104 | A | 11/1998 | Svensson | |
| 6,264,429 | B1 * | 7/2001 | Koeller | |
| 8,816,240 | B2 * | 8/2014 | Lin | B23K 9/1735 219/76.12 |
| 2009/0162207 | A1 | 6/2009 | Peters et al. | |
| 2009/0308847 | A1 * | 12/2009 | Kamimura | B23K 15/0086 219/76.1 |
| 2010/0028160 | A1 * | 2/2010 | Schaeffer | F01D 5/005 416/224 |
| 2012/0266814 | A1 * | 10/2012 | Clark | B23K 26/0643 118/620 |
| 2012/0272611 | A1 | 11/2012 | Tsukimoto et al. | |
| 2013/0032577 | A1 * | 2/2013 | Lin | B23K 9/042 219/76.12 |

FOREIGN PATENT DOCUMENTS

| | | |
|---|---|---|
| CN | 102630193 | 8/2012 |
| DE | 43 10 896 | 3/1994 |
| JP | 58-197403 | 11/1983 |
| JP | 61-12082 | 2/1986 |
| JP | 1-104901 | 4/1989 |
| JP | 1-182504 | 7/1989 |
| JP | 6-170584 | 6/1994 |
| JP | 2008-128147 | 6/2008 |
| JP | 2009-214179 | 9/2009 |
| JP | 2011-147952 | 8/2011 |
| JP | 4901413 | 3/2012 |
| KR | 2011-0029344 | 3/2011 |
| KR | 20110029344 A * | 3/2011 |

OTHER PUBLICATIONS

Excerpt translation of JP 61-12082 previously cited in IDS filed on Mar. 24, 2015.
International Search Report dated Dec. 17, 2013 in International Application No. PCT/JP2013/075526.
Decision to Grant a Patent dated Dec. 10, 2013 in corresponding Japanese patent application No. 2012-208769.
Written Opinion of the International Searching Authority dated Dec. 17, 2013 in International Application No. PCT/JP2013/075526.
Notification of Grant of Invention Patent dated Jul. 13, 2016 in corresponding Chinese patent application No. 201380048562.7 (with English translation).
Notice of Allowance dated Sep. 2, 2016 in Korean patent application No. 10-2015-7006689.
Office Action dated Jun. 18, 2018 in German Patent Application No. 112013004639.3, with English Translation.
Office Action dated Jan. 31, 2019 in Indian Patent Application No. 1571/CHENP/2015 with English translation.
Office Action dated Nov. 2, 2015 in corresponding Chinese patent application No. 201380048562.7 (with English translation).

* cited by examiner

METHOD OF WELDING EROSION RESISTANCE METALLIC MATERIAL AND TURBINE BLADE

TECHNICAL FIELD

The present invention relates to a method of welding erosion resistance metallic material and a turbine blade.

BACKGROUND ART

A steam turbine blade is eroded by impact behavior given by fine solid particles composed mostly of a condensed water droplet and an iron oxide in steam, so that a surface of the steam turbine blade may be worn. Thus, an erosion resistant layer is sometimes formed on a leading edge portion that is in front of the steam turbine blade (an upstream side of steam flow). As a result, erosion of the steam turbine blade is reduced.

PTL 1 discloses a technique of reducing erosion wear by joining an erosion shield provided in its surface with a boriding layer to a base element of a steam turbine blade. In addition, PTL 2 describes a blade leading edge portion that is a part of a blade shape of a turbine rotary blade, and that is cut off so that an erosion prevention part is restored in the blade leading edge portion by using build-up welding with laser.

CITATION LIST

Patent Literature

{PTL 1}
Japanese Examined Patent Application, Publication No. Sho 61-12082
{PTL 2}
The Publication of Japanese Patent No. 4901413

SUMMARY OF INVENTION

Technical Problem

For an erosion resistant layer joined to a base element of a steam turbine blade, a cobalt base alloy with high wear resistance, such as Stellite (registered trademark) composed of cobalt as a main component, or the like, is used, for example. When the cobalt base alloy or the like is joined to the base element, build-up welding by brazing or TIG welding is performed. Unfortunately, in a case of joining by using the brazing, a defect such as joining failure is liable to occur, and degradation of the steam turbine blade is liable to occur due to heating of multiple times caused by rework. In addition, in a case of joining by using the TIG welding, there is a problem in which a base material is mixed with deposit metal such as a cobalt base alloy to dilute the deposit metal. As a result, hardness of erosion resistant layer decreases to deteriorate erosion resistance by the cobalt base alloy or the like.

Figure 16:
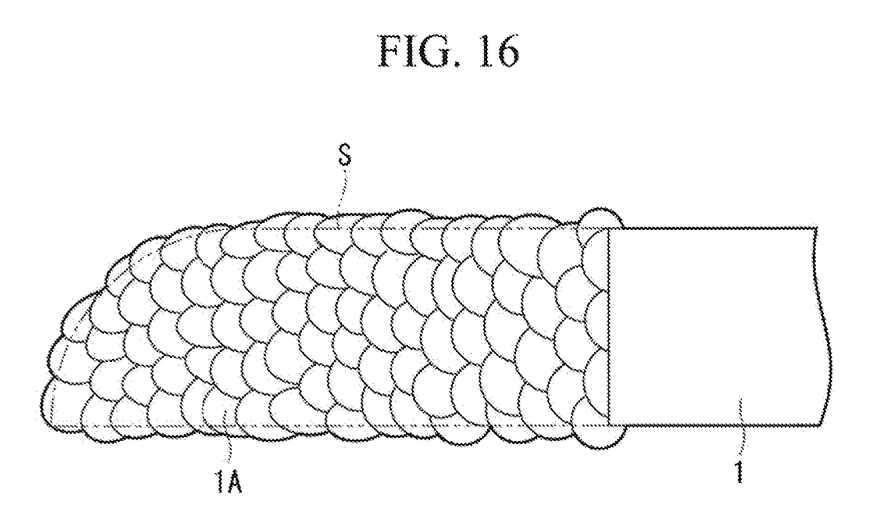
FIG. 16 is a cross-sectional view showing a base element and weld beads of the leading edge portion of the conventional steam turbine blade.

In a technique described in PTL 2, as shown in FIG. 1(c) of PTL 2, after a blade leading edge portion of a turbine rotary blade is cut along a longitudinal direction of the blade to form a belt-like plane, multiple layers are built up on the plane to form an erosion prevention part composed of hard material. FIG. 16 is a cross-sectional view showing a base element 1 of a leading edge portion 1A of a conventional steam turbine blade, and weld beads constituting an erosion prevention part, and two-dot chain lines in FIG. 16 show an designed finish surface S of the erosion prevention part. Since the hard material is brittle as compared with material of a blade body part, the erosion prevention part may come off from the blade body part or may be broken if the whole of the blade leading edge portion is replaced as described in PTL 2.

The present invention is made in light of the above-mentioned circumstances, and it is an object of the present invention to provide a method of welding erosion resistance metallic material and a turbine blade, capable of reducing deterioration of hardness of an erosion resistant layer in a blade leading edge portion.

Solution to Problem

A method of welding erosion resistance metallic material in accordance with a first aspect of the present invention is a method of welding erosion resistance metallic material to a base element of a turbine blade leading edge portion, and the method includes the steps of: forming a curved surface in the leading edge portion to which the erosion resistance metallic material is applied so that a radius of the curved surface is larger than thickness of the base element; and welding the erosion resistance metallic material to the leading edge portion.

According to this structure, the base element of the leading edge portion is formed into a shape that facilitates dissipation of heat, so that it is possible to reduce retention of heat in the base element when the erosion resistance metallic material is welded to the base element. As a result, heat is dissipated from the base element to enable a local temperature rise to be reduced. In addition, it is possible to reduce dilution of the erosion resistance metallic material caused by mixing of the base material into the erosion resistance metallic material to reduce deterioration in hardness of the erosion resistant layer. A cross-sectional shape of a front end portion is not limited to an arc shape, and another shape is available if a blade tip portion can be formed into a smooth curved surface.

A method of welding erosion resistance metallic material in accordance with a second aspect of the present invention is a method of welding erosion resistance metallic material to a base element of a turbine blade leading edge portion, and the method includes the steps of: forming a groove to which erosion resistance metallic material is applied, in the base element on the basis of thicknesses of an designed finish surface of an erosion resistant layer and the erosion resistant layer so that the erosion resistance metallic material is filled in one layer; and welding the erosion resistance metallic material to the groove.

According to this structure, the groove to which the erosion resistance metallic material is applied is formed in the base element on the basis of thicknesses of the designed finish surface of the erosion resistant layer and the erosion resistant layer. The erosion resistance metallic material is a cobalt base alloy, for example. A depth of the groove with respect to the designed finish surface allows the erosion resistance metallic material to be filled in one layer, for example. That is, the depth does not allow multiple layers to be built up by welding, as well as is formed deep as much as possible so that a hardness deterioration area does not appear in the surface. As a result, it is possible to prevent deterioration in erosion resistance. The hardness deterioration area is an area where base material (base element) is mixed into deposit metal by welding.

In the second aspect of the present invention, it is preferable that a depth of the groove is 2 mm or less with respect to the designed finish surface. Accordingly, the depth of the groove allows the erosion resistance metallic material to be filled in one layer, that is, the depth does not allow multiple layers to be built up by welding.

A method of welding erosion resistance metallic material in accordance with a third aspect of the present invention is a method of welding erosion resistance metallic material to a base element of a turbine blade leading edge portion, and the method includes the steps of: determining the amount of overlap of each pass at the time of welding so that a contact portion between a newly-formed bead and an existing bead is wider than a contact portion between the newly-formed bead and the base element; and welding the erosion resistance metallic material to the base element on the basis of the amount of the overlap.

According to this structure, the amount of overlap of each pass at the time of welding increases, and a portion in which the newly-formed bead is in contact with the base element (base material) is less than a contact portion in which the newly-formed bead is in contact with the existing bead. As a result, it is possible to reduce dilution of the erosion resistance metallic material (weld material) caused by mixing of the base material into the erosion resistance metallic material to reduce deterioration in hardness of the erosion resistant layer.

In the first to third aspects of the present invention, it is preferable that dilution of the welded erosion resistance metallic material by material of the base element is 10% or less. Accordingly, dilution of the erosion resistance metallic material is reduced to enable deterioration in hardness of the erosion resistant layer to be reduced.

In the first to third aspects of the present invention, it is preferable that the erosion resistant layer before finishing formed by welding the erosion resistance metallic material is composed of one layer, and is 2 mm or less in thickness.

According to this structure, since dilution by the base material can be reduced, it is possible to form an erosion resistant layer with a minimum thickness required for erosion resistance and high quality.

In the first to third aspects of the present invention, the step of welding the erosion resistance metallic material has a feature of laser weaving transverse to a welding direction to flatten energy density distribution.

According to this structure, it is possible to flatten the energy density distribution to enable a fusion zone to be shallow and wide.

The erosion resistance metallic material may be welded while being supplied in powder form or in belt-like form, or may be welded after the erosion resistance metallic material is applied to a welding portion in advance by thermal spraying or cold spray.

According to this structure, it is possible to reduce the number of passes to reduce occurrence of a defect.

In addition, in a turbine blade in accordance with a fourth aspect of the present invention, an erosion resistant layer is formed in a leading edge portion by the method of welding erosion resistance metallic material.

Advantageous Effects of Invention

According to the present invention, it is possible to reduce deterioration of hardness of an erosion resistant layer in a blade leading edge portion.

DESCRIPTION OF EMBODIMENTS

Hereinafter, the embodiments in accordance with the present invention will be described with reference to the accompanying drawings.

Figure 11:
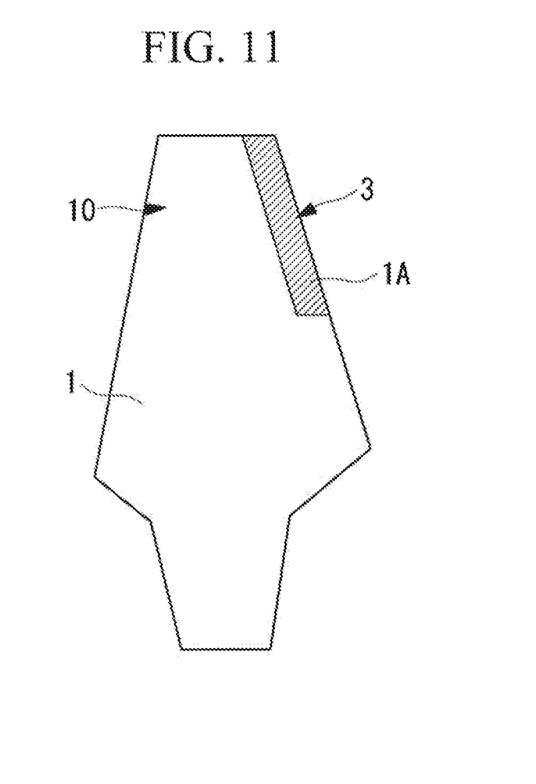
FIG. 11 is a side view showing a steam turbine blade.

First, a structure of a leading edge portion 1A of a steam turbine blade 10 will be described. FIG. 11 is a side view showing the steam turbine blade 10.

The leading edge portion 1A of the steam turbine blade 10 is formed by joining an erosion resistant layer 3 formed of a cobalt base alloy composed of cobalt as a main component to a base element 1. The erosion resistant layer 3 is arranged in the leading edge portion 1A on an upstream side of steam flow in the steam turbine blade 10 when the steam flow occurs by rotation of the steam turbine blade 10. Accordingly, it is possible to reduce erosion of the leading edge portion 1A of the steam turbine blade 10.

Figure 1:
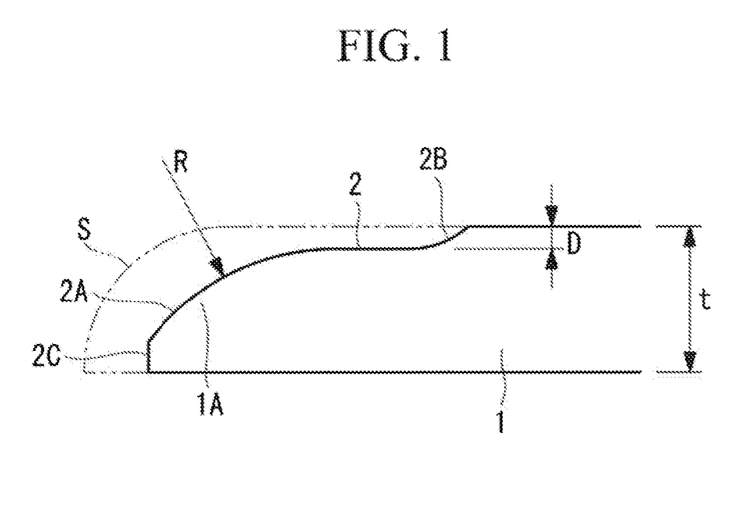
FIG. 1 is a cross-sectional view showing a base element of a leading edge portion of a steam turbine blade in accordance with one embodiment of the present invention.

The base element 1 (base material) is a chromium-based alloy, for example, and has a cross-sectional shape as shown in FIG. 1 before the erosion resistant layer 3 is formed. FIG. 1 is a cross-sectional view showing the base element 1 for forming the leading edge portion 1A of the steam turbine blade 10, taken along a direction vertical to a longitudinal direction of the steam turbine blade 10. Two-dot chain lines in FIG. 1 show the designed finish surface S of the erosion resistant layer 3.

The base element 1 before the erosion resistant layer 3 is formed thereon is provided with a groove 2 that has a shape recessed into the base element 1 with respect to the designed finish surface 3. The groove 2 is provided with a front end portion 2A that is positioned on an upstream side of steam flow when the steam turbine blade 10 is rotated, and is provided with a rear end portion 2B that is positioned on a downstream side of the steam flow.

The front end portion 2A of the groove 2 has a corner formed into an arc shape in cross-section, for example. Radius R of the corner is larger than thickness t of the base element 1, for example. Accordingly, when the erosion resistant layer 3 is formed by a welding method described later, it is possible to reduce retention of heat in the base element 1. The cross-sectional shape of the corner of the front end portion 2A is not limited to an arc shape, and another shape is available if heat is easily dissipated from the base element 1 and a blade tip portion can be formed into a smooth curved surface.

It is preferable that a depth D of the groove 2 in the rear end portion 2B with respect to the designed finish surface S allows the deposit metal to be filled in one layer, that is, the depth does not allow multiple layers to be built up by welding, as well as is formed deep as much as possible so that a hardness deterioration area does not appear in the surface. The depth D of the groove that can be welded by one layer is 2 mm or less, for example. The hardness deterioration area is an area where the base material is mixed into the cobalt base alloy that is deposit metal by welding, and where erosion resistance to be acquired by the cobalt base alloy is deteriorated.

Figure 7:
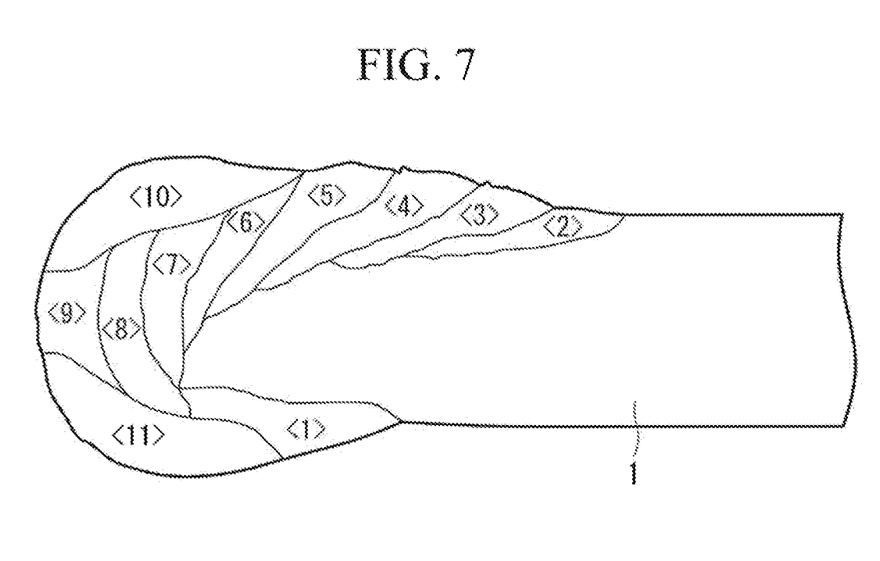
FIG. 7 is a cross-sectional view showing a first example of a leading edge portion of a steam turbine blade in accordance with one embodiment of the present invention.
Figure 8:
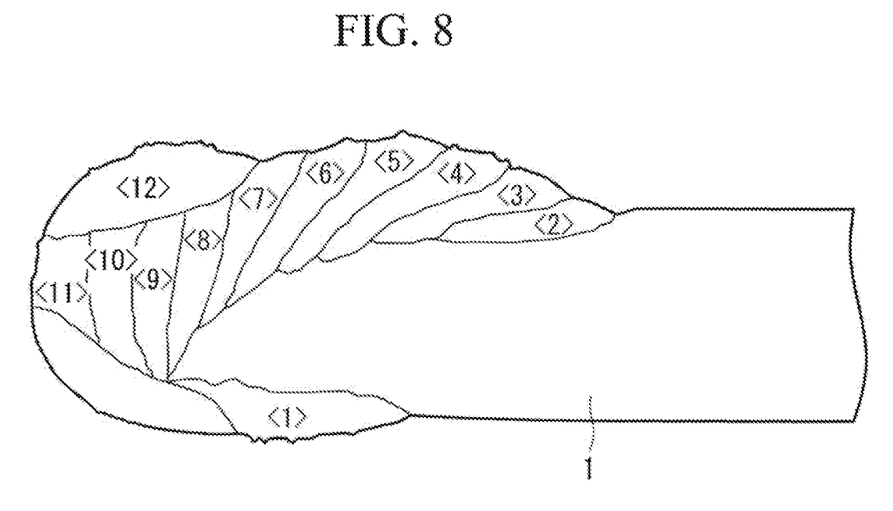
FIG. 8 is a cross-sectional view showing a second example of a leading edge portion of a steam turbine blade in accordance with one embodiment of the present invention.

The erosion resistant layer 3 formed in the groove 2 is formed through a plurality of passes so that one layer is built up by build-up welding, and has a thickness of 2 mm or less in a state before finishing (refer to FIGS. 7 and 8). It is preferable that dilution by the base material is 10% or less in the erosion resistant layer 3. In addition, it is preferable that a tip portion 2C of the groove 2 is formed into a plane as shown in FIG. 1 instead of a sharp shape in order to prevent the base material from melting into deposit metal.

The erosion resistant layer 3 is formed of the cobalt base alloy composed of cobalt as a main component, for example. In the present embodiments, the Stellite (registered trademark) is applicable as the cobalt base alloy, for example. The erosion resistant layer 3 is formed so that weld beads adjacent to each other are overlapped with each other. Each of the weld beads has a portion in contact with the base material and a portion in contact with an adjacent existing weld bead. It is preferable to reduce the portion in contact with the base material, and to increase the portion in contact with an adjacent weld bead (refer to beads <3> to <7> in FIG. 7, and beads <3> to <8> in FIG. 8). The erosion resistant layer 3 is formed by performing pass multiple times. In addition, after weld beads as shown in FIGS. 7 and 8 are formed, the leading edge portion 1A is worked so as to be the designed finish surface S as shown in FIG. 1 by a two-dot chain line.

The leading edge portion 1A as a whole is not replaced with the erosion resistance metallic material (refer to PTL 2 or FIG. 16), but only a surface layer with a uniform thickness along a shape of the base element 1 is formed of the erosion resistance metallic material. As a result, it is possible to reduce damage to the erosion resistant layer 3 formed of the erosion resistance metallic material with brittle properties as compared with the base element 1.

Next, a method of forming the leading edge portion 1A of the steam turbine blade 10 in accordance with the present embodiments, namely a method of joining the erosion resistant layer 3 to the base material, will be described.

First, the groove 2 is formed in the base element 1 of the steam turbine blade 10, and is formed into a shape as shown in FIG. 1, for example. That is, the front end portion 2A of the groove 2 is provided with a corner formed into an arc shape in cross section with the radius R larger than a thickness of the base element 1. In addition, the groove 2 is formed so that the depth D of the rear end portion 2B of the groove 2 allows deposit metal to be filled in one layer as well as the hardness deterioration area does not appear in a surface of the layer.

Next, build-up welding by laser welding is applied to the base element 1 that has a shape as described above so that the erosion resistant layer 3 is formed by one layer. The build-up welding is applied pass multiple times in order as shown by numerals in angle brackets in FIG. 7 or 8. Each of FIGS. 7 and 8 shows an example in which a method of performing pass is different.

At this time, it is possible to reduce the amount of the base material mixed to the cobalt base alloy of the deposit metal by increasing the amount of overlap of each pass at the time of welding to reduce a portion of a weld bead that is in contact with the base material. The amount of overlap is adjusted by using a target angle of laser and the amount of movement between passes, for example.

In a case of laser welding, automatization is possible, so that it is possible to apply appropriate welding corresponding to each condition by creating a program before the welding to allow a welding device to execute the program.

Normal welding devices are available for the laser welding, and in the present embodiments, the laser welding is applied under the following conditions. That is, a positioning camera and a height adjustment jig provided with a height sensor are used. Welding posture is always downward, and movement between passes is performed while the base element 1 is rotated. In a program, a target position of each pass is inputted as a teaching point by teaching. In addition, a deformation shape of the base element 1 due to influence of heat at the time of welding is predicted to set passes so that the passes are moved along the deformation shape of the base element 1 in advance. Further, it is possible to apply welding by preventing position aberration from occurring while feedback is performed by using the positioning camera.

Figure 2:
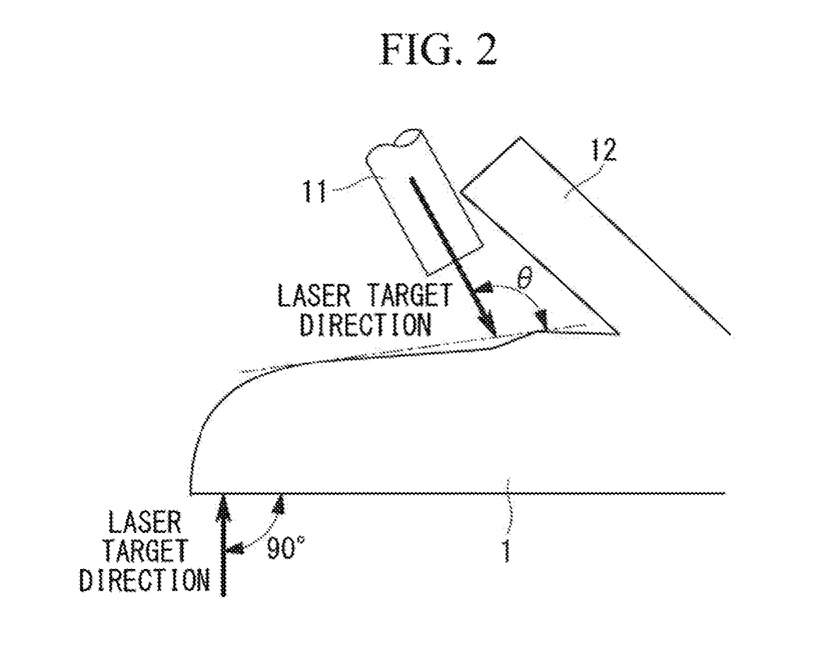
FIG. 2 is a cross-sectional view showing a base element of a leading edge portion of a steam turbine blade in accordance with one embodiment of the present invention.
Figure 3:
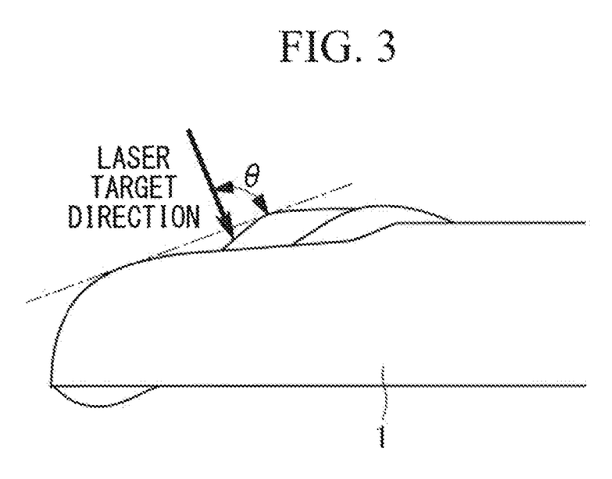
FIG. 3 is a cross-sectional view showing a base element and weld beads of a leading edge portion of a steam turbine blade in accordance with one embodiment of the present invention.
Figure 4:
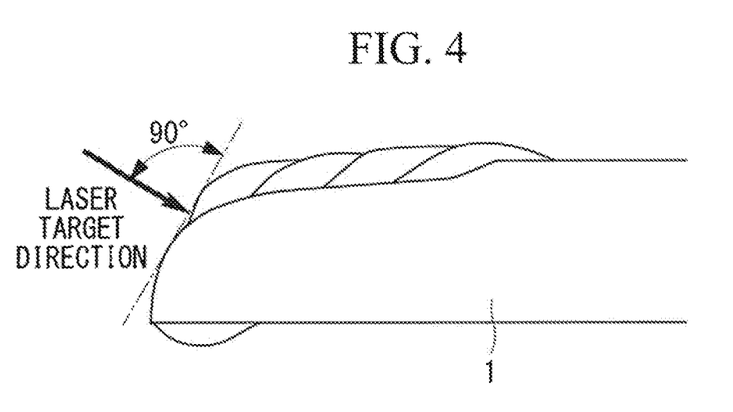
FIG. 4 is a cross-sectional view showing a base element and weld beads of a leading edge portion of a steam turbine blade in accordance with one embodiment of the present invention.
Figure 5:
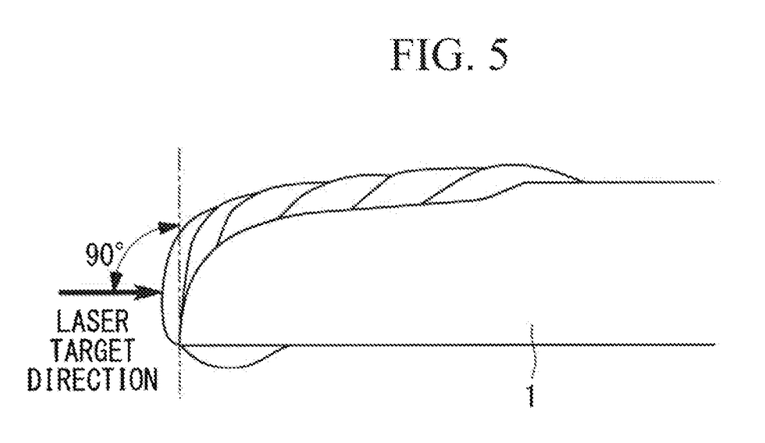
FIG. 5 is a cross-sectional view showing a base element and weld beads of a leading edge portion of a steam turbine blade in accordance with one embodiment of the present invention.
Figure 6:
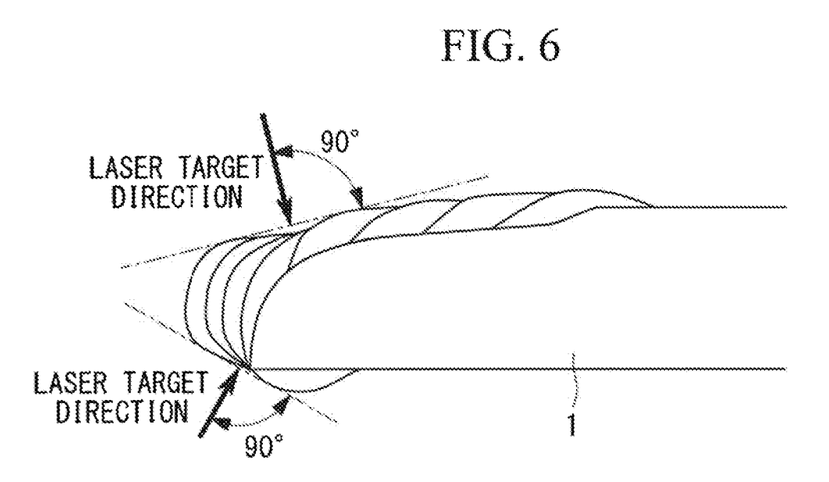
FIG. 6 is a cross-sectional view showing a base element and weld beads of a leading edge portion of a steam turbine blade in accordance with one embodiment of the present invention.
Figure 13:
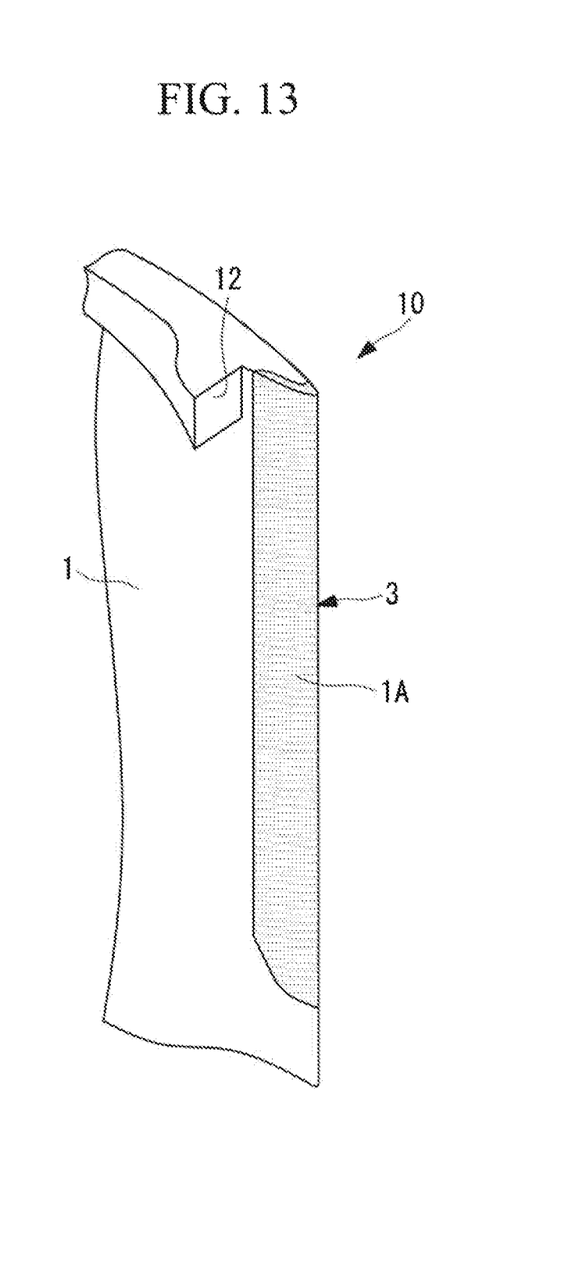
FIG. 13 is a perspective view showing a steam turbine blade.

A target direction of laser is about 90° with respect to a plane of the base material, or is about 90° with respect to a tangent connecting between protrusions. For example, as shown in FIG. 2, in a case where a laser tip portion 11 is positioned close to a shroud portion 12 (refer to FIG. 13) and the like, a welding program is created to set a laser target direction so that a laser tip portion 11 is prevented from interfering with a shroud portion 12 as well as is close to 90° with respect to a tangent connecting two protrusions in a welding portion. In addition, the laser target direction is 90° with respect to a plane surface opposite to an R surface, as shown in FIG. 2. In a case where a bead has been formed as shown in FIGS. 3 and 4, the laser target direction is 90° with respect to a tangent connecting a protrusion of a bead and a protrusion of the base material. In addition, the laser target direction with respect to a tip portion of the base element 1 is parallel to the plane surface as shown in FIG. 5. In a case where two beads are already formed, the laser target direction is 90° with respect to a tangent connecting a protrusion of one bead and a protrusion of the other bead as shown in FIG. 6. Determination of a laser target direction as described above enables weld failure to be reduced, as well as enables the base material to be prevented from being mixed into the deposit metal.

At the time of laser welding, oscillation may be applied to a welding portion. Accordingly, it is possible to reduce weld failure. There is a method of welding while oscillation is applied as follows.

While the erosion resistance metallic material in powder form is supplied to a welding portion in belt-like form, laser at the welding portion is woven in a width direction at high speed to form the erosion resistant layer 3, or while the erosion resistance metallic material in belt-like form with a fixed thickness is supplied to the welding portion, the laser at the welding portion is woven in the width direction at high speed to form the erosion resistant layer 3.

In addition, a layer composed of the erosion resistance metallic material is formed in an overall portion where the erosion resistant layer 3 is to be formed, in advance by thermal spraying or cold spray, and then the laser at the welding portion is woven in the width direction at high speed to form the erosion resistant layer 3. At this time, it is possible to make a range of oscillation of the laser larger as compared with a case of supplying the erosion resistance metallic material in powder form or in belt-like form, and there is no overlap portion of material. As a result, a defect hardly occurs.

Figure 14:
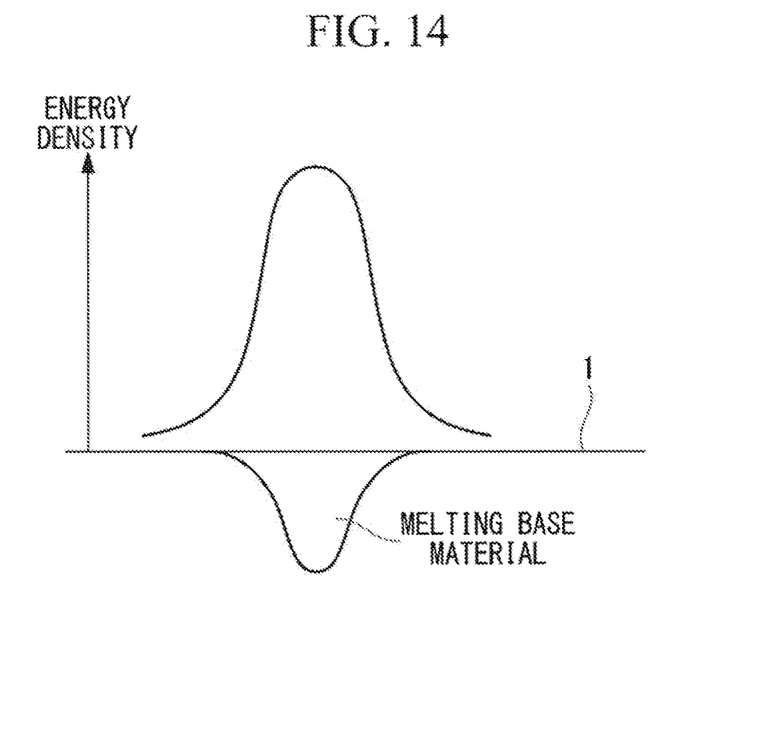
FIG. 14 is a graph showing a relationship between energy density distribution of laser and a fusion zone formed by welding in a case of laser without weaving at high speed.
Figure 15:
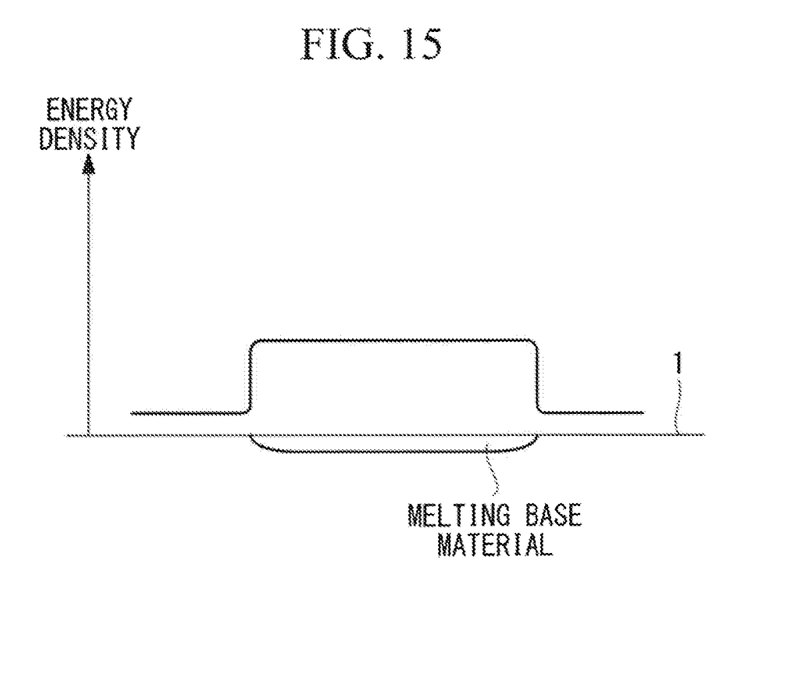
FIG. 15 is a graph showing a relationship between energy density distribution of laser and a fusion zone formed by welding in a case of laser with weaving at high speed.

Here, the width direction is transverse to a welding direction of the laser. In addition, the high speed allows energy density distribution of the laser at the welding portion to be a rectangle shape instead of a mountain shape to shallow a dilution portion into which the base material is mixed. While normal weaving welding is performed at a frequency of a few Hz, in the present embodiments, weaving welding is performed at a frequency within a range from a few tens Hz to a few hundreds Hz. That is, if the laser is not woven at high speed, the energy density distribution becomes a mountain shape as shown in FIG. 14, so that a fusion zone is deepened. In contrast, if the laser is woven at high speed, it is possible to flatten the energy density distribution, as shown in FIG. 15. As a result, it is possible to make the fusion zone shallow and wide.

As described above, the method of the present embodiments enables the number of passes at the time of build-up welding to be reduced to reduce the number of defects. As a result, it is also possible to improve work efficiency. In addition, since the energy density distribution of the laser is flattened, dilution of the erosion resistant layer 3 by the base material is reduced. Further, since the dilution by the base material can be reduced, it is possible to form the erosion resistant layer 3 with a minimum thickness required for erosion resistance and high quality.

As above, according to the method, of forming the leading edge portion 1A of the steam turbine blade 10 in accordance with the present embodiments, the following operation effects can be acquired.

First, a corner to be formed in the front end portion 2A of the groove 2 in the base element 1 of the steam turbine blade 10 is formed into an arc shape in cross section with the radius R larger than a thickness of the base element 1, so that it is possible to reduce retention of heat in the corner at the time of welding. Heretofore, the corner is formed into an arc shape in cross section with the radius $R_O$ shorter than the thickness of the base element 1, and such a cross-sectional shape of the base element 1 above does not allow heat accumulated by being received from the deposit metal to be easily dissipated. On the other hand, if an arc shape of the corner in cross section is made gentle like the present embodiments, heat is dissipated from the base element 1 to enable a local temperature rise to be reduced. As a result, it is possible to reduce dilution of the deposit metal caused by mixing of the base material into the deposit metal to reduce deterioration in hardness of the erosion resistant layer 3.

In addition, the rear end portion 2B of the groove 2 in the base element 1 of the steam turbine blade 10 is formed so as to be deep from the designed finish surface S of the erosion resistant layer 3 as much as possible, so that it is possible to position a dilution area in which the base material is mixed into the deposit metal inside the steam turbine blade 10 instead of the surface side of the steam turbine blade 10. As a result, the dilution area in which hardness is deteriorated due to mixing of the base material into the deposit metal hardly appear in the surface of the steam turbine blade 10, so that it is possible to form the steam turbine blade 10 provided with the erosion resistant layer 3 in which hardness is assured.

Figure 12:
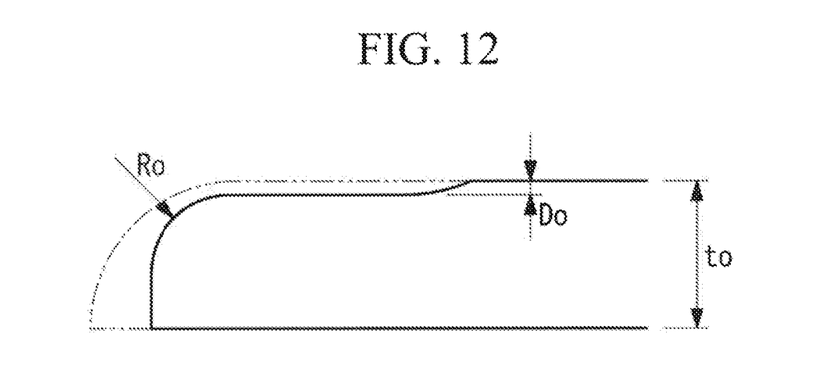
FIG. 12 is a cross-sectional view showing a base element of a leading edge portion of a conventional steam turbine blade.

On the other hand, as shown in FIG. 12, if the groove 2 is shallow, a dilution area with low hardness is close to the designed finish surface S of the erosion resistant layer 3. Thus, erosion resistance may be deteriorated.

In addition, since the depth of the groove 2 allows the deposit metal to be filled in one layer, it is possible to reduce a temperature rise of the base material in a case of multilayer welding. As a result, it is possible to reduce a dilution rate of the deposit metal.

Further, it is possible to reduce dilution of the deposit metal caused by mixing of the base material into the deposit metal to reduce hardness deterioration in the erosion resistant layer 3 by increasing the amount of overlap of each pass at the time of welding to reduce a portion of a weld bead that is in contact with the base material.

Furthermore, application of laser welding enables welding operation to be automatized to properly form a weld, as well as enables a dilution rate of the deposit metal to be reduced by reducing heat input to the base material.

In the method of welding described above, the erosion resistant layer 3 formed in the groove 2 is composed of one layer formed by welding so that dilution by the base material is 10% or less.

Each of FIGS. 7 and 8 shows an example of a cross section of a leading edge portion of a steam turbine blade when the laser welding is performed under conditions as follows: a thickness of the base element 1 is 4.6 mm; a radius of the corner is 7.8 mm; a depth of the groove is 0.8 mm; and the amount of overlap of each welding pass is 3.2 mm. The numeral in angle brackets shows order of passes.

Figure 9:
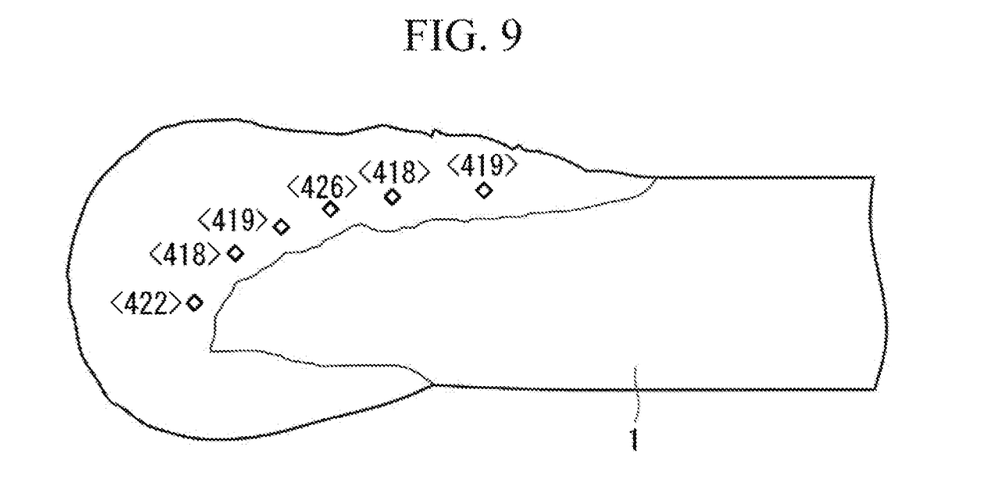
FIG. 9 is a cross-sectional view showing a hardness measurement result of the leading edge portion shown in FIG. 7.
Figure 10:
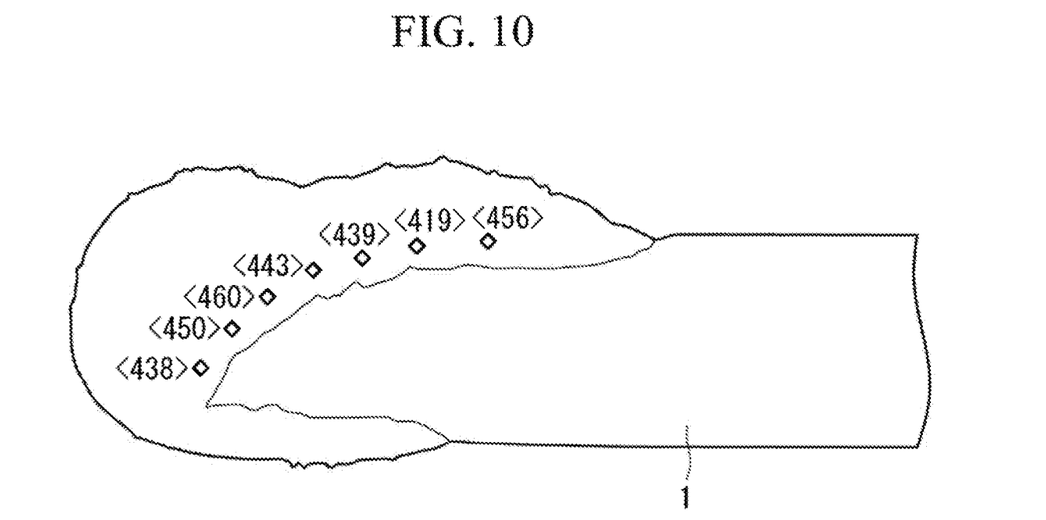
FIG. 10 is a cross-sectional view showing a hardness measurement result of the leading edge portion shown in FIG. 7.

FIGS. 9 and 10 show results of Vickers hardness measurement test of the erosion resistant layers 3 formed by build-up welding in the orders shown FIGS. 7 and 8, respectively. Unit of numeric values in angle brackets is hardness Hv. Each of measurement points corresponds to the designed finish surface S of the erosion resistant layer 3. From the measurement results, it is found that values exceeding hardness Hv 400 are measured in the designed finish surface S. Thus, it is verified that it is possible to form the erosion resistant layer 3 with hardness of Hv 400 or more.

In the present embodiments, although a case of joining the erosion resistant layer 3 by laser welding is described, the present invention is not limited to this example, and even in a case of another welding method such as TIG welding, it is possible to acquire an operation effect as with the embodiments described above by forming a shape of the base material, and the erosion resistant layer 3 as with the above.

In addition, in the present embodiments, although the cobalt base alloy such as the Stellite (registered trademark) is given as the erosion resistance metallic material of the erosion resistant layer, another metallic material other than the above is applicable to the erosion resistance metallic material depending on base material and use environment. As the erosion resistance metallic material, all of materials by which effects of erosion resistance are expected, such as a material harder than the base material, may be applicable.

REFERENCE SIGNS LIST 1 base element
2 groove
3 erosion resistant layer
10 steam turbine blade
11 laser tip portion
12 shroud portion
S designed finish surface

The invention claimed is:

1. A method of welding erosion resistance metallic material to a base element of a turbine blade leading edge portion, the method comprising:
   forming a groove into the base element, the groove having a shape recessed into the base element,
   forming a curved surface in a front end portion of the groove so that a radius of the curved surface is larger than a thickness of the base element from a suction side to a pressure side at a rear end portion of the groove; and
   welding the erosion resistance metallic material to the groove so as to form the leading edge portion, and
   wherein dilution of the welded erosion resistance metallic material by material of the base element is 10% or less.

2. The method of welding erosion resistance metallic material according to claim 1, the method further comprising:
   determining an amount of overlap of each pass at the time of welding so that a contact portion between a newly-formed bead and an existing bead is wider than a contact portion between the newly-formed bead and the base element; and
   welding the erosion resistance metallic material to the base element based on the amount of the overlap.

3. The method of welding erosion resistance metallic material according to claim 1, wherein an erosion resistant layer before finishing formed by welding the erosion resistance metallic material is composed of one layer, and is 2 mm or less in thickness.

4. A method of welding erosion resistance metallic material to a base element of a turbine blade leading edge portion, the method comprising:
   forming a groove to which the erosion resistance metallic material is applied in the base element based on a thicknesses of a designed finish surface of an erosion resistant layer and the erosion resistant layer so that the erosion resistance metallic material is filled in one layer; and
   welding the erosion resistance metallic material to the groove,
   wherein the groove has a depth so that an area where the base element is mixed into the erosion resistance metallic material by welding does not appear in the designed finish surface.

5. The method of welding erosion resistance metallic material according to claim 4, wherein the depth of the groove is 2 mm or less with respect to the designed finish surface.

6. The method of welding erosion resistance metallic material according to claim 4, wherein dilution of the welded erosion resistance metallic material by material of the base element is 10% or less.

7. The method of welding erosion resistance metallic material according to claim 4, wherein the erosion resistant layer before finishing formed by welding the erosion resistance metallic material is composed of the one layer, and is 2 mm or less in thickness.

8. The method of welding erosion resistance metallic material according to claim 4, wherein the welding of the erosion resistance metallic material includes a laser weaving transverse to a welding direction to flatten energy density distribution.

9. The method of welding erosion resistance metallic material according to claim 4, the method further comprising:
   determining an amount of overlap of each pass at the time of welding so that a contact portion between a newly-formed bead and an existing bead is wider than a contact portion between the newly-formed bead and the base element; and
   welding the erosion resistance metallic material to the base element based on the amount of the overlap.

10. A method of welding erosion resistance metallic material to a base element of a turbine blade leading edge portion, the method comprising:
    forming a groove into the base element, the groove having a shape recessed into the base element,
    forming a curved surface in a front end portion of the groove so that a radius of the curved surface is larger than a thickness of the base element from a suction side to a pressure side at a rear end portion of the groove; and
    welding the erosion resistance metallic material to the groove so as to form the leading edge portion, and
    wherein the welding of the erosion resistance metallic material includes a laser weaving transverse to a welding direction to flatten energy density distribution.

11. The method of welding erosion resistance metallic material according to claim 10, wherein the erosion resistance metallic material is welded while being supplied in powder form or in belt-like form, or is welded after the erosion resistance metallic material is applied to a welding portion in advance by thermal spraying or cold spray.

12. A turbine blade comprising:
    a leading edge portion including a base element;
    an erosion resistant layer that is formed in the leading edge portion;
    a groove formed in the base element, the groove having a shape recessed into the base element; and
    a curved surface formed in a front end portion of the groove such that a radius of the curved surface is larger than a thickness of the base element from a suction side to a pressure side at a rear end portion of the groove,
    wherein an erosion resistance metallic material is welded to the groove so as to form the leading edge portion, and dilution of the welded erosion resistance metallic material by material of the base element is 10% or less.

13. A method of welding erosion resistance metallic material to a base element of a turbine blade leading edge portion, the method comprising:
forming a groove into the base element, the groove having a shape recessed into the base element,
forming a curved surface in a front end portion of the groove so that a radius of the curved surface is larger than a thickness of the base element from a suction side to a pressure side at a rear end portion of the groove,
welding the erosion resistance metallic material to the groove so as to form the leading edge portion,
determining an amount of overlap of each pass at the time of welding so that a contact portion between a newly-formed bead and an existing bead is wider than a contact portion between the newly-formed bead and the base element; and
welding an erosion resistance metallic material to the base element on the basis of the amount of the overlap, and
wherein the erosion resistant layer before finishing formed by welding the erosion resistance metallic material is composed of one layer, and is 2 mm or less in thickness.

14. A method of welding erosion resistance metallic material to a base element of a turbine blade leading edge portion, the method comprising:
forming a groove into the base element, the groove having a shape recessed into the base element,
forming a curved surface in a front end portion of the groove so that a radius of the curved surface is larger than a thickness of the base element from a suction side to a pressure side at a rear end portion of the groove,
welding the erosion resistance metallic material to the groove so as to form the leading edge portion,
determining an amount of overlap of each pass at the time of welding so that a contact portion between a newly-formed bead and an existing bead is wider than a contact portion between the newly-formed bead and the base element; and
welding the erosion resistance metallic material to the base element on the basis of the amount of the overlap, and
wherein the welding of the erosion resistance metallic material includes a laser weaving transverse to a welding direction to flatten energy density distribution.

15. A turbine blade comprising:
a leading edge portion including a base element;
an erosion resistant layer that is formed in the leading edge portion; and
a groove to which erosion resistance metallic material is applied formed in the base element, the groove being based on a thicknesses of a designed finish surface of the erosion resistant layer and the erosion resistant layer so that the erosion resistance metallic material is filled in one layer,
wherein the erosion resistance metallic material is welded to the groove, and
the groove has a depth so that an area where the base element is mixed into the erosion resistance metallic material by welding does not appear in the designed finish surface.

16. A method of welding erosion resistance metallic material to a base element of a turbine blade leading edge portion, the method comprising:
forming a curved surface in the leading edge portion to which the erosion resistance metallic material is applied so that a radius of the curved surface is larger than a thickness of the base element from a suction side to a pressure side at a rear end portion of a groove to which the erosion resistance metallic material is applied; and
welding the erosion resistance metallic material to the leading edge portion,
wherein dilution of the welded erosion resistance metallic material by material of the base element is 10% or less.

17. A method of welding erosion resistance metallic material to a base element of a turbine blade leading edge portion, the method comprising:
forming a curved surface in the leading edge portion to which the erosion resistance metallic material is applied so that a radius of the curved surface is larger than a thickness of the base element from a suction side to a pressure side at a rear end portion of a groove to which the erosion resistance metallic material is applied; and
welding the erosion resistance metallic material to the leading edge portion,
wherein the welding of the erosion resistance metallic material includes a laser weaving transverse to a welding direction to flatten energy density distribution.

18. The method of welding erosion resistance metallic material according to claim 17, wherein the erosion resistance metallic material is welded while being supplied in powder form or in belt-like form, or is welded after the erosion resistance metallic material is applied to a welding portion in advance by thermal spraying or cold spray.

19. A turbine blade comprising:
a leading edge portion including a base element;
an erosion resistant layer that is formed in the leading edge portion; and
a curved surface formed in the leading edge portion to which an erosion resistance metallic material is applied such that a radius of the curved surface is larger than a thickness of the base element from a suction side to a pressure side at a rear end portion of a groove to which the erosion resistance metallic material is applied,
wherein the erosion resistance metallic material is welded to the leading edge portion, and
dilution of the welded erosion resistance metallic material by material of the base element is 10% or less.

20. A turbine blade comprising:
a leading edge portion including a base element;
an erosion resistant layer that is formed in the leading edge portion; and
a curved surface formed in the leading edge portion to which erosion resistance metallic material is applied such that a radius of the curved surface is larger than a thickness of the base element from a suction side to a pressure side at a rear end portion of a groove to which the erosion resistance metallic material is applied; and
wherein the erosion resistance metallic material is welded to the leading edge portion, and
the welding of the erosion resistance metallic material includes a laser weaving transverse to a welding direction to flatten energy density distribution.

* * * * *